Aug. 21, 1934.  A. G. HERRESHOFF  1,970,800
SEAT CONSTRUCTION
Filed May 8, 1930
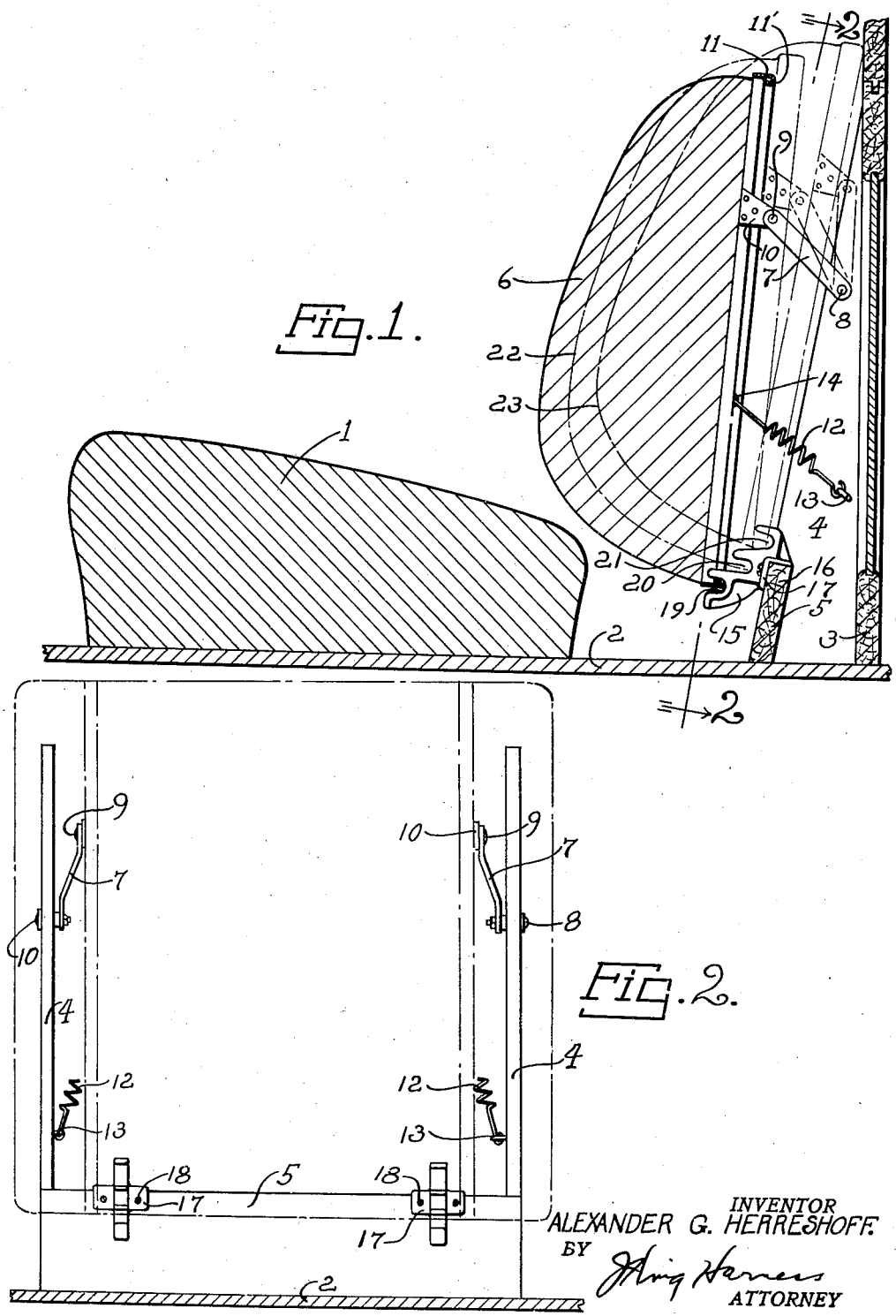
INVENTOR
ALEXANDER G. HERRESHOFF
BY
ATTORNEY Patented Aug. 21, 1934

1,970,800

UNITED STATES PATENT OFFICE 1,970,800

SEAT CONSTRUCTION

Alexander G. Herreshoff, Highland Park, Mich., assignor to Chrysler Corporation, Detroit, Mich., a corporation of Delaware Application May 8, 1930, Serial No. 450,834

6 Claims. (Cl. 155—158)

This invention relates to an improved back cushion supporting structure for vehicle seats, particularly for truck cabs.

The main objects of this invention are to provide simple and inexpensive supporting means for the back cushion of a seat which will allow the back cushion to be selectively placed in one of a plurality of different positions; to provide supporting means of this kind by which the back cushion of a seat can be adjustably positioned both vertically and horizontally with respect to the seat proper thereof so as to condition the seat for drivers of various heights; and to provide means of this kind which may be installed without materially altering the conventional construction of truck cabs.

An illustrative embodiment of this invention is shown in the accompanying drawing, in which:

Fig. 1 is a fragmentary vertical section showing the seat construction of a truck cab.

Fig. 2 is a section taken on the line 2—2 of Fig. 1.

In the form shown, a seat cushion 1 is mounted on a floor 2 of the driver's compartment or cab of a truck which has a rear wall 3. Mounted on the inner sides of the rear wall 3 and floor 2 of the driver's cab are a pair of spaced triangular shaped supports 4 which are connected at their lower extremities by a transverse member or cleat 5, the member 5 being inclined as shown in Fig. 1.

A back cushion 6 is located between the seat 1 and the supporting structure of the rear wall 3. The back cushion is swingably mounted on the supports 4 by a pair of links 7, the inner ends of which are pivotally mounted at 8 on the supports 4. The outer ends of the links are pivoted at 9 to brackets 10 which are rigidly mounted on a metal rim 11 having a bead 11' on its outer edge and secured to the rear side of the back cushion 6. The lower end of the back cushion 6 is normally urged in the direction of the rear wall 3 of the cab by a pair of springs 12 which are each secured at one end to eyes 13 on the supports 4 and at their other end to eyes 14 on the rim 11.

A pair of brackets or racks 15 each having an angular shaped seat 16 and outwardly extending flanges 17 are mounted on the transverse member 5 by screws 18 or other suitable means. The racks 15 are located at an inclination to the floor 2 and they are provided with vertically spaced, horizontally offset recesses 19, 20 and 21 for receiving the lower side of the beaded rim 11.

In operation, the back cushion 6 may be swung outwardly at its lower end and selectively engaged in any one of the recesses 19, 20 and 21 so as to adjustably position the cushion 6 both vertically and horizontally with respect to the seat cushion 1. The springs 12 urge the lower end of the back cushion to the right and tend to swing the links in a clockwise direction about their pivots 8 as viewed in Fig. 1, thereby retaining portions of the beaded rim 11 engaged in the recess into which it has been seated and in position to engage the upper wall of each recess. In this manner, the back cushion 6 may be placed in the full line position shown in Fig. 1 or in either of the dotted line positions 22 and 23 shown therein so as to adapt the seat structure for drivers of various sizes.

Although but one specific embodiment of this invention has herein been shown and described, it will be understood that various changes including the size, shape and arrangement of parts may be made without departing from the spirit of my invention and it is not my intention to limit its scope other than by the terms of the appended claims.

I claim:

1. In a seat, a base structure, a seat cushion mounted thereon, supporting structure mounted on said base portion and located rearwardly of said seat cushion, a link pivotally mounted on said supporting structure and extending forwardly and upwardly therefrom, a back cushion swingably mounted on the front end of said link and having a rearwardly protruding element, resilient means yieldably urging said back cushion toward said supporting structure and means on said supporting structure including vertically spaced and registering flanges providing recesses having substantially horizontal upper face portions, the protruding element of said back cushion being engageable in said recesses and with the upper face portions thereof for holding said back cushion against upward movement and preventing pivotal movement of said link so as to retain said back cushion at a selected inclination to a vertical plane.

2. In a seat, a base structure, a seat cushion mounted thereon, supporting structure mounted on said base portion associated with said seat cushion, a back cushion having a protruding element, means extending upwardly from and swingably supporting said back cushion on said supporting structure and adapted to guide a portion thereof into different horizontal and vertical positions, resilient means for urging said back cushion toward said supporting structure, and means on said supporting structure including a pair of brackets, each having vertically spaced horizontally offset notches for receiving said protruding element and provided with substantially horizontal upper faces for holding said first named means and said back cushion against swinging from a selected position.

3. In combination, a motor vehicle having a floor, a support on said floor, a back cushion having a protruding element at its lower end portion, means extending forwardly and upwardly from, and swingably supporting said back cushion on, said support and adapted to guide the upper portion thereof into different vertical and horizontal positions, a rack on said support having vertically spaced notches therein for receiving said protruding element, each of said notches having an upper substantially horizontal side wall portion engageable with said protruding element so as to hold said means against swinging and said back cushion in selected vertical positions, and resilient means yieldably resisting displacement of said protruding element from the notch in which it is received and urging said protruding element against the extremity of said notch and said upper side wall portion thereof, the extremities of said notches being horizontally spaced so as to retain said back cushion at a different inclination when it is in each of said different vertical positions respectively.

4. In seat construction, a floor, a seat cushion mounted on said floor, a support mounted on said floor in related proximity to said seat cushion, a pair of links each pivotally mounted on respectively opposite sides of said support, a back cushion swingably pivoted on the free ends of said links having a rearwardly extending flange, and a pair of racks mounted on said support each having vertically spaced and horizontally offset recesses therein for receiving said flange so as to selectively position said back cushion both vertically and horizontally with respect to said seat cushion.

5. In seat construction, a supporting structure having a substantially upright member, a pair of links each pivotally mounted on respectively opposite sides of said member, a back cushion swingably pivoted on the free ends of said links having a rearwardly extending flange, a pair of racks mounted on said supporting structure each having vertically spaced and horizontally offset recesses therein for receiving said flange so as to selectively position said back cushion both vertically and horizontally with respect to said supporting structure.

6. In seat construction, a floor, a seat cushion mounted on said floor, a support mounted on said floor in related proximity to said seat cushion, a pair of links each pivotally mounted on respectively opposite sides of said support, a back cushion swingably pivoted on the free ends of said links having a rearwardly extending flange, a pair of racks mounted on said support each having vertically spaced and horizontally offset recesses therein for receiving said flange so as to selectively position said back cushion both vertically and horizontally with respect to said seat cushion, and springs coacting between said back cushion and said support yieldably holding said flange in the recesses of said racks.

ALEXANDER G. HERRESHOFF.